April 4, 1950          E. S. HOOBLER          2,502,522
SELF-CONTROLLED AIRCRAFT LANDING GEAR
Filed Aug. 14, 1945          4 Sheets-Sheet 1
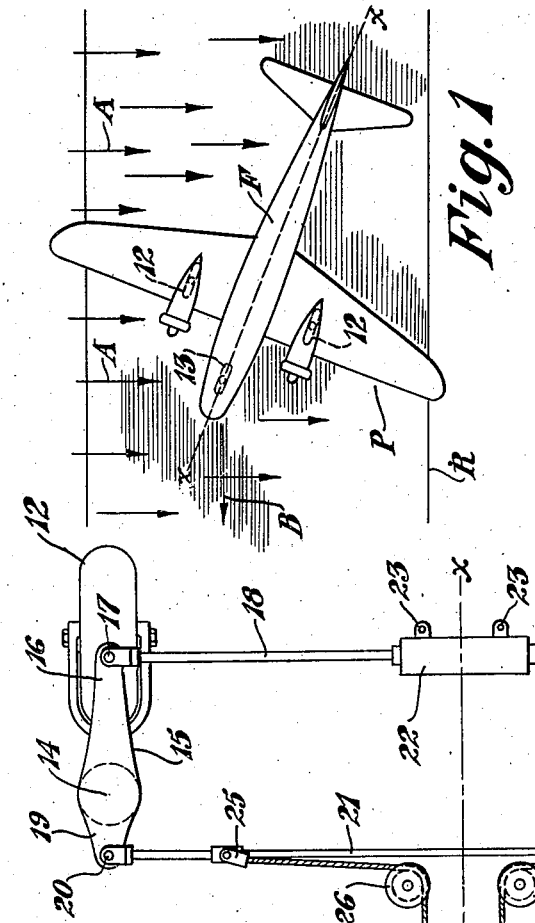
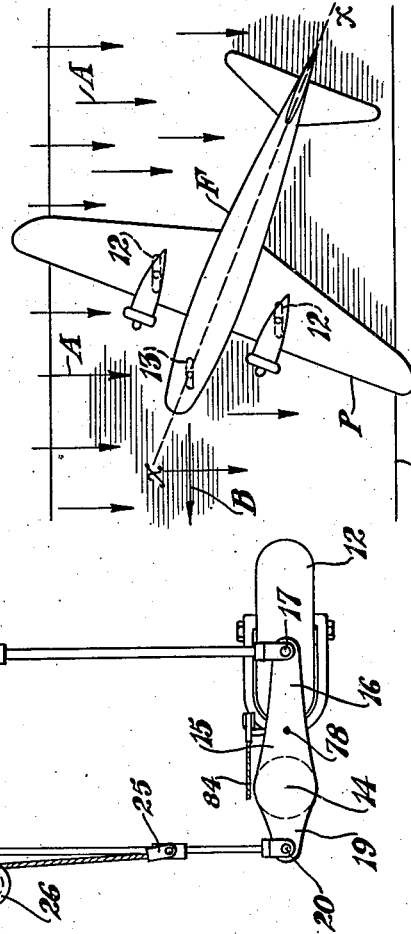
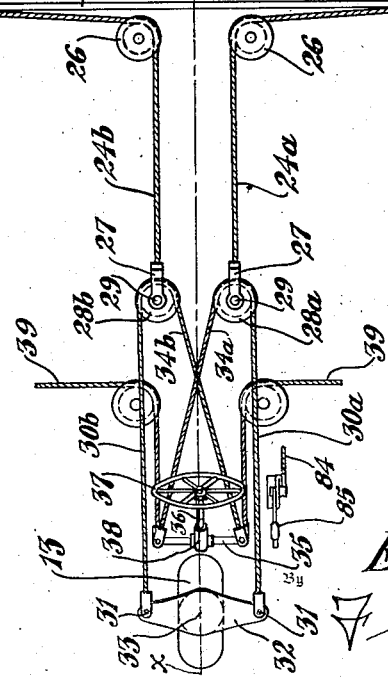
Inventor
Ernest S. Hoobler
Frease and Bishop
Attorneys April 4, 1950     E. S. HOOBLER     2,502,522
SELF-CONTROLLED AIRCRAFT LANDING GEAR Filed Aug. 14, 1945     4 Sheets-Sheet 2

Inventor
*Ernest S. Hoobler*
By Freare and Bishop
Attorneys

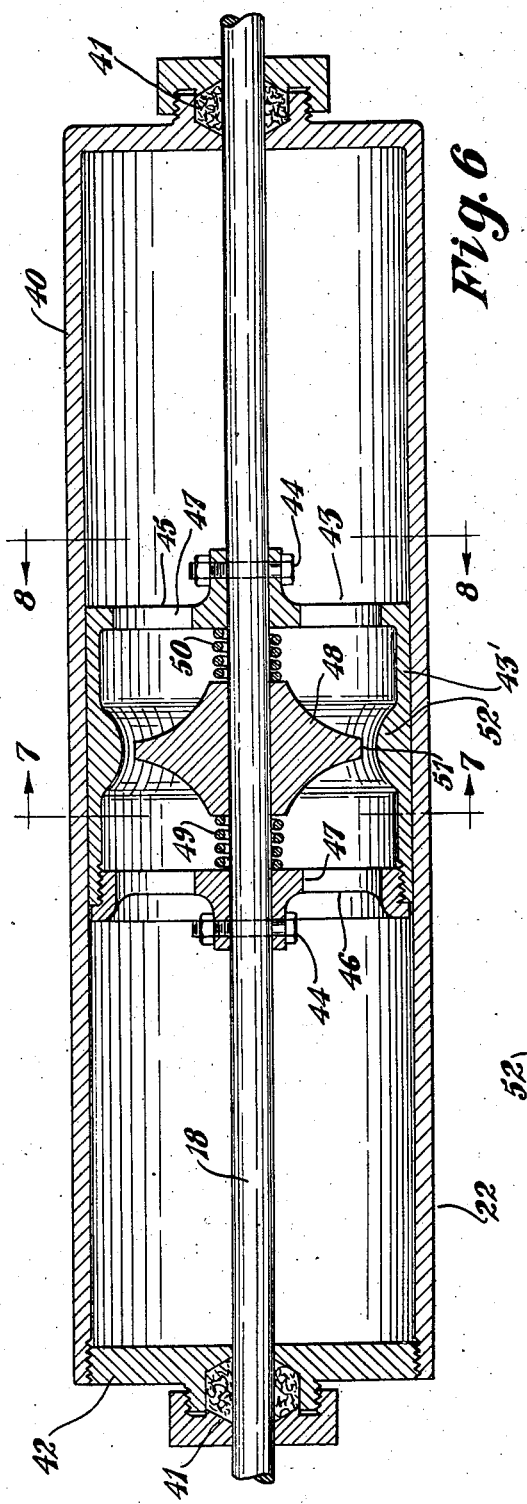

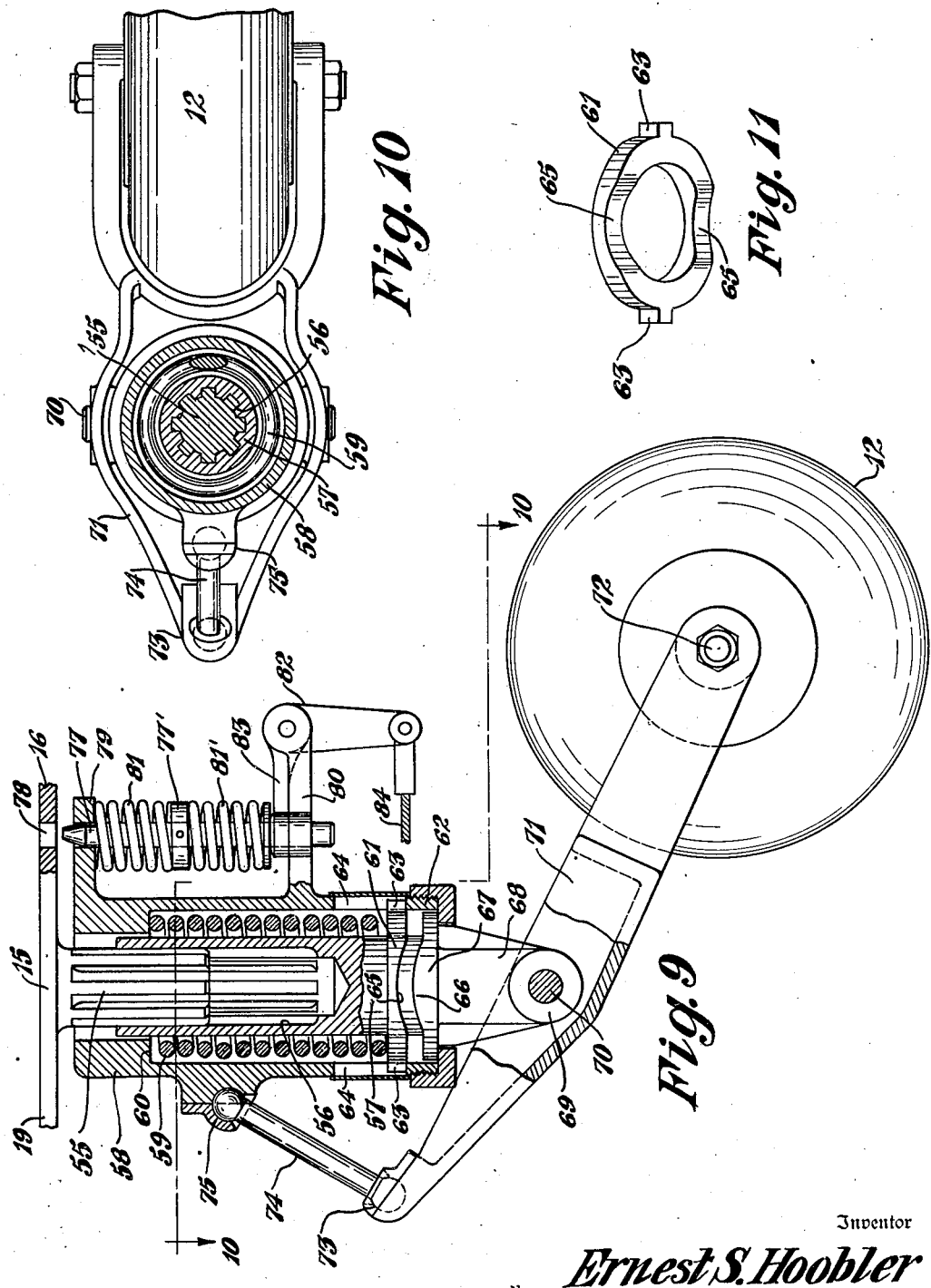

Patented Apr. 4, 1950

2,502,522

UNITED STATES PATENT OFFICE 2,502,522

SELF-CONTROLLED AIRCRAFT LANDING GEAR

Ernest S. Hoobler, Canton, Ohio

Application August 14, 1945, Serial No. 610,720

5 Claims. (Cl. 244—50)

The invention relates generally to aircraft undercarriage construction or landing gear, and more particularly to aircraft landing gear which is self-controlled for landing or taking off cross wind.

It is well known that in landing or taking off an aircraft, the best practice is to direct the aircraft against the direction of the wind, but there are many cases where it is desirable or necessary due to restricted landing field or runway areas, to land or take off cross wind, that is, at an angle to the direction of the wind. Moreover, in cases where it is necessary to make a forced landing because of motor trouble or for some other reason, it is often impossible to land safely in an available field or clearing in a direction other than cross wind.

In order to make a cross wind landing with a conventional three control aircraft, it is necessary for the pilot to practice many hours before he becomes skillful enough to execute the performance without damage, shock or stress on the aircraft. In making a cross wind landing, the pilot must hold his ship on a "crabbed" or angular approach, that is, headed into the wind at an angle to the direction of drift, until he is within a few inches of the ground. Then in a split second, he must put up the inner wing by manipulating its aileron and simultaneously reverse the rudder so as to line up his wheels with the direction of force in which the plane is moving.

Obviously, such landing operation requires great skill and is seldom executed perfectly, so that shock and strain are imparted to the aircraft, and in severe cases the plane is wrecked and the occupants injured or killed.

Taking off cross wind also requires much skill because the pilot must judge the angle of drift and manipulate his controls to head the plane into the wind at the proper angle just as it leaves the ground.

Recently, the trend in construction of modern aircraft for civilian use has been toward simplicity in operation and control, so that the average person can learn to fly easily and with substantial safety. Thus, if the smaller aircraft for civilian use is provided with a two-control mechanism, the pilot has only his control stick or wheel to think of in making his landing or take off, because the usual separate rudder pedals or controls are incorporated in the wheel or stick as well as the aileron controls. Accordingly, when the pilot turns his steering wheel to make a turn, he turns his rudder and simultaneously operates his ailerons.

While this type of control simplifies greatly the operation of the aircraft, it prevents making a cross wind landing safely because the ailerons and rudder cannot be operated independently as is necessary during the last few seconds just before contacting the ground in a cross wind landing. Accordingly, a forced landing cross wind may result in a crash landing with fatal or severe injuries to the pilot and passengers, together with damage to the aircraft itself.

Prior cross wind landing controls have been proposed which require the pilot to observe drift indicator instruments and to set his landing wheels accordingly in preparation for a cross wind landing. Such constructions require two or three additional operations and involve accurate judgment on the part of the pilot, and frequently the angle of drift changes materially as the ship nears the ground, so that the pilot does not have time to reset his wheels, and severe shock and damage to the aircraft and possible injuries may result.

In taking off cross wind with such prior constructions, the pilot is required to first set his landing wheels according to his estimate of the angle of drift, and if his estimate is inaccurate the plane will not be crabbed or headed into the wind at the proper angle.

Moreover, such prior constructions complicate the pilot's duties and are contrary to the present trend toward simplifying the flying operation.

It is therefore an object of the present invention to provide a novel and improved aircraft landing gear which will overcome all of the foregoing disadvantages.

Another object is to provide a novel aircraft landing control which is adapted to make a two-control aircraft suitable for landing and taking off cross wind.

Another object is to provide a self-controlled aircraft landing gear which can be applied to a two-control aircraft without requiring additional controls or complicating the pilot's operation.

A further object is to provide a novel self-controlled aircraft landing gear which is adapted for landing cross wind without any shock or strain to the aircraft.

Another object is to provide a novel landing gear which enables an aircraft to move down a runway in a crabbed position for taking off cross wind, so that the aircraft leaves the ground headed into the wind at the proper angle, without requiring the pilot to make any corrections for drift.

A still further object is to provide a novel landing gear which is self-aligning, and which enables an aircraft landing cross wind to move to roll freely on the ground in the direction of force or resultant.

Another object is to provide a novel self-controlled landing gear for landing an aircraft cross wind, which after landing permits easy steering of the aircraft by manipulating the ordinary control wheel.

Another object is to provide a novel self-controlled landing gear which is applicable to a tricycle landing gear with a nose wheel for steering; and also to a conventional landing gear with a rear wheel for steering.

A further object is to provide a novel cross wind landing gear which is so constructed as to prevent vibration or shimmy of the wheels during landing or take off.

Finally, it is an object of the present invention to provide a simple and self-aligning landing gear for aircraft, which is adapted to align the wheels with the direction of force when the plane first lands, and then to gradually bring the main landing wheels into alignment with the fuselage as the plane slows to a stop.

These and other objects apparent from the following description, are accomplished by the parts, elements, constructions, arrangements, combinations and sub-combinations, comprising the present invention, the nature of which is set forth in the following general statement, and preferred embodiments of which are set forth in the following description and illustrated in the accompanying drawings, in which is particularly and distinctly pointed out and set forth in the appended claims forming part hereof.

In general terms, the nature of the invention may be stated as including an aircraft having a caster mounting for each of the main landing wheels with a linkage or connecting rod arrangement for tying said wheels together to cause them to turn together about vertical pivots, said linkage embodying vibration or shimmy dampener and being operatively connected to a third landing wheel for turning it in the same direction as the main wheels, and a control wheel or steering device connected to the said operative connection means for steering said third landing wheel.

In the accompanying drawings, preferred embodiments of the invention are shown by way of example.

Figure 1 is a diagrammatic plan view of an aircraft embodying the present invention, about to land cross wind on a runway, and having its landing wheels aligned or parallel with its fuselage;

Fig. 2 is a similar view of the aircraft immediately after contacting the runway, showing the landing wheels aligned with the runway;

Fig. 3 is a diagrammatic plan view of the landing gear or undercarriage of an aircraft embodying the present invention, with the wheels in the position of being aligned with the fuselage as in Fig. 1;

Fig. 6 is a longitudinal cross sectional view of the novel vibration or shimmy dampener embodied in the linkage connecting the main landing wheels;

Fig. 7 is a cross sectional view thereof as on line 7—7, Fig. 6;

Fig. 8 is a cross sectional view thereof as on line 8—8, Fig. 6;

Fig. 9 is an enlarged fragmentary vertical sectional view, partly in elevation of one of the main landing wheel caster mountings;

Fig. 10 is a fragmentary plan sectional view thereof as on line 10—10, Fig. 9;

Fig. 11 is a detached perspective view of the cam surface bearing washer embodied in the wheel mounting of Fig. 9.

Similar numerals refer to similar parts throughout the drawings.

Figure 4:
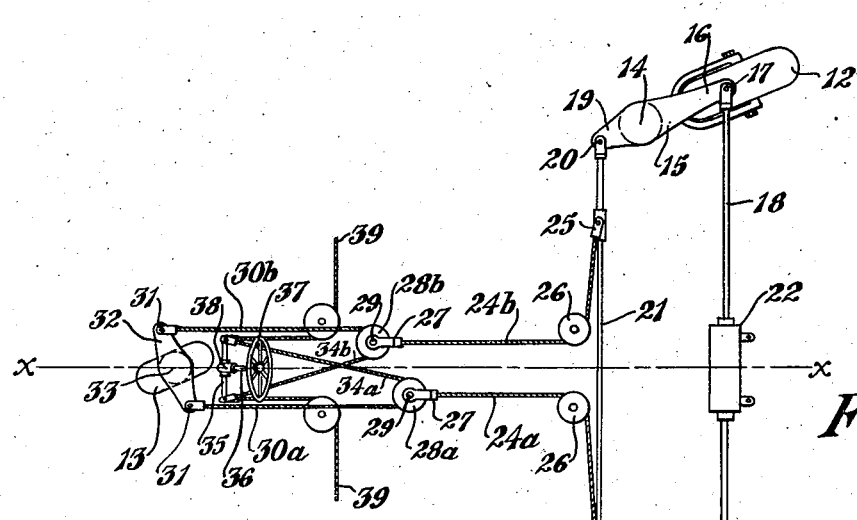
Fig. 4 is a similar diagrammatic plan view on a reduced scale, with the wheels turned to a position such as shown in Fig. 2.

While the present invention is shown by way of example as embodied in the landing gear or undercarriage of a tricycle type landing gear, it is to be understood that the invention may be applied to aircraft having a tail steering wheel, and to aircraft having separate rudder controls without a steerable tail wheel, without departing from the scope of the appended claims forming part hereof.

Referring first to Figs. 1 and 3, the novel undercarriage or landing gear is shown embodied in a tricycle landing gear of an aircraft P having two main landing wheels 12 located on opposite sides of the fuselage F, and a front steerable nose wheel 13 located under the front end of the fuselage F and in a vertical plane passing through its axis $x$—$x$.

In conventional planes having the tricycle type landing gear, the main landing wheels 12 cannot be turned about a vertical axis, but are always aligned longitudinally with the plane, that is, are parallel with the axis $x$—$x$, in the position shown in Figs. 1 and 3. Thus a two-control plane of this type cannot be landed cross wind as in Fig. 1 because the wheels 12 would skid on contacting the runway and damage or crack up the plane.

The present invention provides an off center pivotal mounting or caster mounting for each of the wheels 12 so that they can rotate or "caster" to a limited extent about the vertical pivots indicated at the points 14. Thus, the plane can approach a runway R in a crabbed position or at an angle headed into the wind, the direction of which is represented by the arrows A in Figs. 1 and 2, and as the plane settles onto the ground, the main wheels 12 will, upon contacting the runway, turn in the direction of force indicated by the arrow B, which is the resultant of the force of the cross wind and the force of the forward motion of the plane along the axis $x$—$x$. The wheels 12 are operatively connected to the front wheel 13 so that as they turn they immediately turn the wheel 13 in the same direction, and as wheel 13 settles upon the runway, it is already parallel with the same.

Thus, no skidding of any of the wheels results from contact with the runway, and the plane can roll forwardly parallel to the runway without any danger of shock or damage or cracking up the plane, and without requiring any preliminary operations by the pilot.

The linkage or connecting rod arrangement which ties the wheels 12 together so that they turn in unison preferably includes lever plates 15 which turn with the wheels 12 about the pivots 14 in a manner to be described later herein. The rear ends 16 of the levers 15 are preferably pivotally connected at 17 to the ends of a cross rod 18, and the front ends 19 of the levers 15 are pivotally connected at 20 to the ends of a cross rod 21. Accordingly, as one of the wheels turns on its vertical pivot and turns the lever 15 with it, such motion is transmitted by the rods 18 and 21 to the opposite lever 15 and wheel 12 so that the wheels 12 turn in unison.

A vibration or shimmy dampener indicated generally at 22 is preferably mounted by means of suitable brackets 23 upon the frame of the airplane and the rod 18 is arranged to reciprocate within the dampener 22 for cushioning the lateral shock on the wheels 12 as they hit the ground and turn in the direction of the resultant force. The construction of the dampener 22 will be described more fully later herein.

The means operatively connecting the wheels 12 with the steering wheel 13, which is shown in this case as a nose wheel, to turn wheel 13 in unison with wheels 12, preferably includes cables 24a and 24b connected at their rear ends by means of suitable clamps 25 to the rod 21 on opposite sides of the axis x—x, and being trained intermediate their ends around pulleys 26 which are suitably journalled at fixed locations on the frame of the aircraft. The forward portions of the cables 24a and 24b extend from the pulleys 26 forwardly parallel to the axis x—x and are attached to the yokes 27 of pulleys 28a and 28b. The shafts 29 of pulleys 28a and 28b are movably journalled in a well-known manner upon the frame of the aircraft, so that the pulleys 28a and 28b move longitudinally of the aircraft and can reciprocate longitudinally with respect to each other as the cross link 21 moves laterally due to turning of the wheels 12.

A pair of cables 30a and 30b are looped over the pulleys 28a and 28b respectively, the outer strands of the cables 30a and 30b being pivotally connected at 31 to the outer ends of a lever 32 which rotates with the nose wheel 13 about its vertical pivot 33. The inner strands of the cables 30a and 30b are shown at 34a and 34b and extend from the pulleys 28 diagonally forward to cross each other with their forward ends being pivotally connected to opposite ends of the elevator control shaft 35 on which the steering post 36 of a control wheel 37 is mounted in a usual manner. The elevator control shaft 35 is operatively connected by suitable means (not shown) to the elevators of the aircraft, so that as the shaft 35 is axially rotated by oscillating the wheel 37 back and forth, elevators are controlled in a conventional manner.

Figure 5:
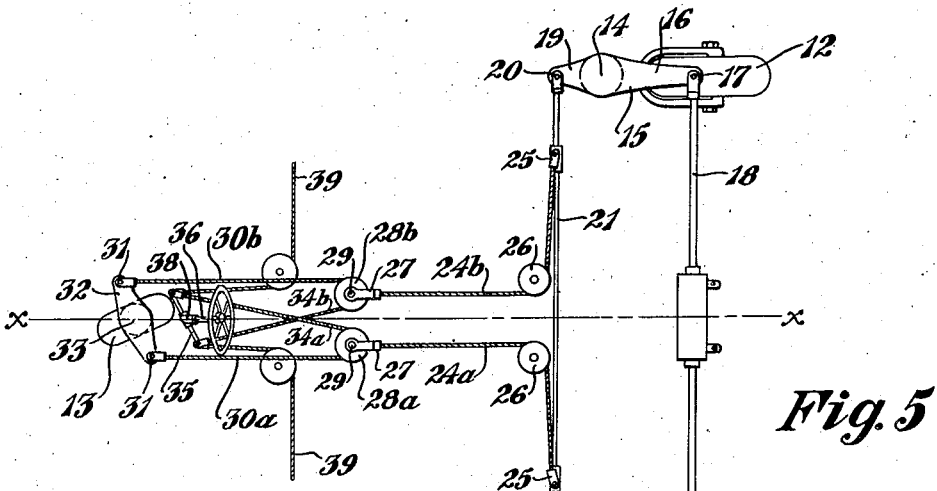
Fig. 5 is a similar diagrammatic plan view showing the front steering wheel turned and the main landing wheels parallel with the fuselage.

The connection between the post 36 and the control shaft 35 may include suitable mechanism which transmits the axial rotating motion of the steering wheel 37 and post 36 to the shaft 35 in such manner that it swings horizontally about its center pivot 38, in the manner shown in Fig. 5. The elevator control shaft 35 is also pivotally connected to the ends of cables 39 which are operatively connected in a usual manner to the aileron and rudder controls, so that axial rotation of the control wheel 37 turns the elevator control shaft 35 about its vertical axis 38 and controls both the ailerons and rudders and steers the wheel 13 independently of the main landing wheels 12; while at the same time the control wheel 37 may be oscillated back and forth to control the elevators.

The construction of control wheel 37 and its connections with the various controls may be modified within the scope of the present invention, as long as the control device for flying the aircraft is adapted for steering the auxiliary wheel 13 without steering the main wheels 12.

The connection of the elevator controls to the control wheel 37 together with the aileron and rudder controls represents an embodiment of the so-called two-control aircraft, and follows broadly the principles of conventional aircraft of that type. The present invention provides a means for adapting said principle to an undercarriage in which the main wheels caster on vertical pivots and their turning motion is transmitted to the front wheel, which is steerable independently of the main wheels.

As shown in Figs. 1 to 5 inclusive, as an aircraft such as shown in Fig. 1 embodying the present invention approaches a runway R at an angle headed into a cross wind, the wheels 12 and 13 are aligned longitudinally with the plane, and the pilot does not need to read any instruments or make any preparations for landing. As the plane settles onto the runway R, according to usual practice the main wheels 12 strike first, and because of their caster mountings are immediately turned in the direction of the resultant force indicated by the arrow B which is the direction of the runway. As the wheels turn in this direction, as indicated in Figs. 2 and 4, the dampener 22 cushions the lateral shock and the transverse motion of tie rod 21 pulls the left cable 24a and its pulley 28a rearwardly and allows right cable 24b and its pulley 28b to move forwardly, as indicated in Fig. 4, with the result that the left cable 30a pulls rearwardly on lever 32 and the right cable 30b moves forwardly. Thus, the front wheel 13 of the undercarriage is turned immediately in a direction parallel with the main landing wheels 12, without any rotation of the control wheel 37, and as the front wheel 13 settles on the runway all three landing wheels 12 and 13 are in a position to roll forwardly down the runway R, as best indicated in Fig. 2.

If it is desired to steer the aircraft while the plane is taxiing upon a landing field, the same is accomplished by steering the front wheel 13 with the control wheel 37 in the same manner as the conventional tricycle landing gear. In this case, as shown in Fig. 5, the main landing wheels 12 remain aligned longitudinally with the aircraft, or parallel to the axis x—x, so that the pulleys 28a and 28b remain fixed with respect to the airplane, and as the wheel 37 is turned to steer the front landing wheel 13, the control shaft 35 turns on its center pivot 38 and causes a pull on left cable 30a to turn the front wheel as shown without disturbing the alignment of the main wheels 12.

Referring to the shimmy dampener indicated generally at 22, as shown in Figs. 6, 7 and 8, the cross rod 18 passes axially through the cylindric housing 40 of the dampener, and the ends of the housing preferably have suitable packing glands 41 providing seals around the rod 18. As shown, one end of the housing may be a removable plate 42 which is screwed in the housing for assembly purposes. Thus, the housing 40 provides a sealed cylinder for containing suitable fluid such as oil.

The rod 18 has a piston box indicated generally at 43 secured thereon as by bolts 44, and adapted for reciprocating within the cylinder 40, which is secured to the frame of the aircraft by the brackets 23. The piston 43 includes a cylindric outer wall 43' slidable in cylinder 40, and end walls 45 and 46, the end wall 46 being preferably screwed on the cylindric wall 43' for assembly purposes. The end walls 45 and 46 are provided with a plurality of relatively large openings 47 permitting passage of a substantial amount of fluid through the piston, as it reciprocates within the cylinder 40.

Within the piston box 43 a floating diaphragm valve 48 is slidably mounted on the rod 18, being yieldingly held in central position with respect to the end walls 45 and 46 by helical springs 49 and 50. The periphery 51 of the diaphragm 48 may be circular as shown, and the inner periphery of the wall 43' of the piston box has an inwardly extending annular boss 52 intermediate its end walls, which is radially spaced from the outer periphery 54 of the diaphragm. The clearance between 51 and 52 is such as to provide a flow of oil through the piston sufficient to permit relatively gradual movement of the rod and piston longitudinally of the cylinder, but a quick movement is yieldingly resisted.

Accordingly, as the wheels 12 turn suddenly, as by striking the ground at an angle to the direction of motion of the plane, the shock of the turning motion imparted thereto is transmitted to the rod 18 to move it through the cylinder 40, and such motion is yieldingly resisted by the resistance to the flow of fluid through the piston box 43, caused by the floating diaphragm 48. The pressure of the fluid on the diaphragm causes it to move longitudinally on the rod 18 against the action of spring 49 or 50, which gradually increases the clearance between the outer rim 51 of the diaphragm and the boss 52 and allows passage of a greater amount of fluid throughout the piston box. Thus, the shock of the turning motion of wheels 12 is cushioned, preventing oscillation or shimmy of the wheels as the plane lands, or taxis.

Referring to the novel mounting construction for the main landing wheels 12, the mountings for both wheels 12 are identical, and one is shown in Figs. 9, 10 and 11. The lever plate 15 has a depending splined post 55 which is coaxial with and slidable vertically within the splined bore 56 of the vertical pivot shaft 57 on which the landing wheel 12 is carried. The pivot shaft 57 is slidably and rotatably mounted in a tubular housing 58, and a shock absorbing helical spring 59 engirdles the shaft 57 within the housing 58. The upper end of the spring 59 abuts an annular shoulder 60 in the housing 58 and the lower end of the spring abuts a washer 61 which is vertically slidable on the shaft 57, and normally abuts a bushing 62 at the bottom end of the housing.

As shown in Fig. 11, the washer 61 is provided with diametrically opposite ribs 63, and these ribs are slidable in slots 64 within the housing 58, so that the shaft 57 can slide vertically within the washer 61, but the washer 62 is held against rotation within the housing. The bottom of washer 61 is provided with cam surfaces as shown, which may be diametrically opposite grooves or curved recesses 65, and these grooves are normally positioned directly over mating curved ribs 66 formed on a collar 67 which is secured to the bottom end of the shaft 57. Such normal position is occupied when the main wheels 12 are parallel with the fuselage.

A bracket ear 68 depends axially from the bottom of shaft 57 and is provided with a bearing 69 in which a horizontal pivot pin 70 is journalled, and lever means comprising the yoke or clevis 71 which mounts the wheel 12 at its rear end and is carried intermediate its ends on said horizontal pivot pin 70. The rear end of the yoke 71 mounts an axle 72 on which the wheel 12 may be journalled in usual fashion, and a suitable brake may be incorporated in the wheel in accordance with well known practice, but the same forms no part of the present invention.

The wheel 12 is accordingly mounted off-center on the shaft 57 to provide a caster mounting which causes the wheel to follow in the direction of resultant force or motion of the airplane when the wheel contacts the ground. The front end of the yoke 71 has a ball and socket connection indicated at 73 with the lower end of a link 74, and the upper end of link 74 has a similar ball and socket connection indicated at 75 with the side of the housing 58 in which the pivot shaft 57 is journalled. The function of this connection between the front end of the yoke 71 and the housing 58 is to limit swinging movement of wheel 12 about pivot shaft 57 and to provide a means urging the wheels 12 to return to their aligned position of Fig. 3 when they have been turned by contact with the ground as in a cross wind landing; and the function of the cooperating cam surfaces 65 and 66 is to aid in returning wheels 12 to their aligned positions.

In the operation of the novel mounting construction, as the wheel 12 strikes the ground on a cross wind landing and is immediately turned toward the direction of force, the lateral shock throws the front end of the yoke 71 at the joint 73 laterally to oscillate about the joint 75 as a pivot, and at the same time the impact on the wheel 12 throws the horizontal pivot pin 70 upwardly together with the pivot shaft 57 and compresses the springs 59. As the spring 59 absorbs the impact, the curved ribs 66 ride rotatably on the cam surfaces or recesses 65 of the washer 61 which is held against rotation.

The weight of the plane exerted on pivot pin 70 has the effect of a downward pull on the joint 73 tending to return it to center or normal position with respect to joint 75, and at the same time, the pressure between the cam surfaces 65 and 66 tends to rotate the shaft 57 to its normal axial position of Fig. 9. Consequently, after the plane has landed and begins to slow down on the runway, the combined effect of these two forces will tend to gradually bring the wheels 12 back into alignment parallel with the fuselage as the plane slows to a stop, and the pilot can easily straighten out the plane by steering the front wheel 13 to align it with the runway.

In order to hold the rear wheels in alignment with the plane for taxiing purposes, a locking device may be provided on one of the main wheel mountings, and as shown in Fig. 9 may include a locking pin 77 which is adapted to enter a hole 78 in the lever plate 15 when the wheels are aligned with the plane as in the position of Fig. 3. Preferably, the pin 77 has a collar 77' attached thereto intermediate its ends, and is slidably mounted at its ends in flanges 79 and 80 projecting from the housing 58. Compression springs 81 and 81' are interposed between the collar 77' and the flanges 79 and 80, and a bell crank 82 is pivoted on the flange 80 and has one arm 83 engirdling the pin 77 and adapted for compressing spring 81' to urge the pin upwardly.

The other arm of bell crank 82 is operatively connected by means of a cable 84 to a suitable hand lever 85 located near the control 37. Thus, when the pilot desires to lock the wheels 12 for taxiing, he pulls the hand lever 85 to actuate the lever arm 83 and urge the pin 77 upwardly against the lever plate 15, and when the wheels 12 are brought into alignment, the pin 77 will snap into the hole 78 and lock the wheels in that position. When the hand lever 85 is released, the pressure of spring 81 will snap the pin 77 out of the hole 78 and release the wheels 12.

The present invention provides a self-controlled landing gear which is adapted to be applied both to aircraft of the two-control type and three-control, for landing cross wind, and enables a pilot to make such landing without preparatory manipulations of the controls and without estimating the angle of drift or reading instruments to determine the same. With the present invention, the pilot makes a landing cross wind by merely holding his plane in a crabbed position such as to keep the plane moving in the direction of the runway as it approaches the ground, and as the landing wheels strike the ground, they align themselves with the resultant direction of force so that the plane can roll freely and safely in that direction.

With an aircraft embodying the present invention, the pilot merely steers the nose or tail wheel as he moves down the runway, depending on whether the landing gear is tricycle or the conventional type having a steerable tail wheel. If the invention is applied to the type of aircraft having rudder pedals and no steerable wheel, the steering can be done by manipulating the brakes in a usual manner.

If a plane embodying the present invention makes a landing cross wind, as previously described, the novel caster mounting tends to return the wheels in alignment with the plane as the plane slows down. This straightening up of the plane can be accelerated to some extent by manipulating the brakes in a usual fashion as in the ordinary airplane.

In taking off cross wind with an aircraft embodying the present invention, as the plane moves down the runway, the effect of the cross wind is to swing the plane into a crabbed position at an angle to the wind, so that as the plane leaves the ground, it is in proper position for the take off, that is, it is nosed into the wind while moving in the direction of the resultant force. With prior constructions, in which the main landing wheels cannot pivot on vertical axes, the pilot is required to use utmost skill in swinging the plane into a crabbed position at the instant it leaves the ground; otherwise, damage or crack-up to the plane may occur due to sudden drift of the plane.

In prior constructions requiring preparing for taking off by setting the wheels at a particular angle depending upon the direction of the cross wind with respect to the runway, the pilot's estimate of the angle of drift may be inaccurate, and in any event, additional operations and skill on the part of a pilot are involved.

Thus, the present invention provides a simple and inexpensive landing gear construction which overcomes the disadvantages of prior constructions with respect to landing or taking off cross wind, and which is easily applied to all conventional types of aircraft.

In the foregoing description, certain terms have been used for brevity, clearness and understanding, but no unnecessary limitations are to be implied therefrom beyond the requirements of the prior art, because such words are used for descriptive purposes and are intended to be broadly construed.

Moreover, the embodiments of the improved construction illustrated and described are by way of example, and the scope of the present invention is not limited to the exact details of the various parts.

Having now described the features of the invention, the new and useful devices, constructions, arrangements, combinations, sub-combinations, parts and elements, and reasonable mechanical equivalents thereof obvious to those skilled in the art, are set forth in the appended claims.

I claim:

1. Aircraft landing gear construction including laterally spaced main landing wheels and an auxiliary landing wheel spaced longitudinally thereof, means providing a free turning caster mounting for each of the main landing wheels to permit them to caster freely when engaging the ground, means operatively connecting said main landing wheels for causing them to turn in unison on their mountings, a vibration dampener embodied in said main wheel connecting means for preventing shimmy of the main wheels on landing, control means operatively connecting said main landing wheel connecting means to said auxiliary wheel for turning it in unison with said main landing wheels, and means attached to said control means for steering said auxiliary wheel independently of said main landing wheels.

2. In an aircraft having laterally spaced main landing wheels and an auxiliary landing wheel spaced longitudinally thereof, a pilot-operated control device for steering the aircraft in flight, free turning caster mounting means for the main landing wheels to permit them to caster freely when engaging the ground, means operatively connecting said main landing wheels, single vibration dampener means for cushioning lateral shock imparted to said main landing wheels on striking the ground when landing, control means operatively connecting said main landing wheels with said auxiliary landing wheel for turning said auxiliary wheel with said main landing wheels as they turn on their caster mounting means, and means connecting said control means to said pilot-operated control device for steering said auxiliary wheel independently of said main landing wheels.

3. In an aircraft having laterally spaced main landing wheels, a caster mounting for each of said wheels including a housing, a vertical shaft pivoted in said housing, means in said housing yieldingly resisting upward movement of said shaft in the housing, a washer slidably engirdling said shaft and slidably and non-rotatably mounted in said housing, cooperating cam means on said washer and shaft tending to rotatively return said shaft to its normal axial position, a lever having a horizontal pivotal connection intermediate its ends with the bottom end of said pivot shaft, means journalling a main landing wheel on one end of said lever, and a link having a universal connection at one end with the other end of said lever and a universal connection at the other end of said link with said housing.

4. Aircraft landing gear construction including laterally spaced main landing wheels and an auxiliary landing wheel spaced longitudinally thereof, a free turning caster mounting for each main wheel including a housing, a vertical shaft slidable and rotatable in said housing and means mounting a main landing wheel off-center on said shaft; tie means operatively and rigidly connecting said shafts for turning said main landing wheels in unison, single vibration dampener means connected to said shafts for preventing shimmy of said main landing wheels on landing, and control means operatively connecting said tie means to said auxiliary wheel for turning the same in unison with said landing wheels.

5. Aircraft landing gear construction including laterally spaced main landing wheels and an auxiliary landing wheel spaced longitudinally thereof, a free turning caster mounting having a vertical pivot for each main wheel, means operatively and rigidly connecting said main wheels for turning on said pivots in unison, means operatively connecting said main wheels to said auxiliary wheel for causing it to turn with the free castering movement of said main landing wheels, and releasable means for locking the main wheels in normal position in alignment with said aircraft.

ERNEST S. HOOBLER.

REFERENCES CITED

The following references are of record in the file of this patent:

UNITED STATES PATENTS

| Number | Name | Date |
|---|---|---|
| 1,844,186 | Short | Feb. 9, 1932 |
| 2,211,484 | Warner | Aug. 3, 1940 |
| 2,222,850 | Maclaren | Nov. 26, 1940 |
| 2,291,571 | Cleveland | July 28, 1942 |
| 2,393,110 | Kops et al. | Jan. 15, 1946 |

FOREIGN PATENTS

| Number | Country | Date |
|---|---|---|
| 9,413 | Great Britain | 1907 |